May 15, 1956  C. C. KITTERMAN  2,745,681
VEHICLE COUPLER DRAW BAR FOR TOWING TRAILERS
Filed April 30, 1953  2 Sheets-Sheet 1
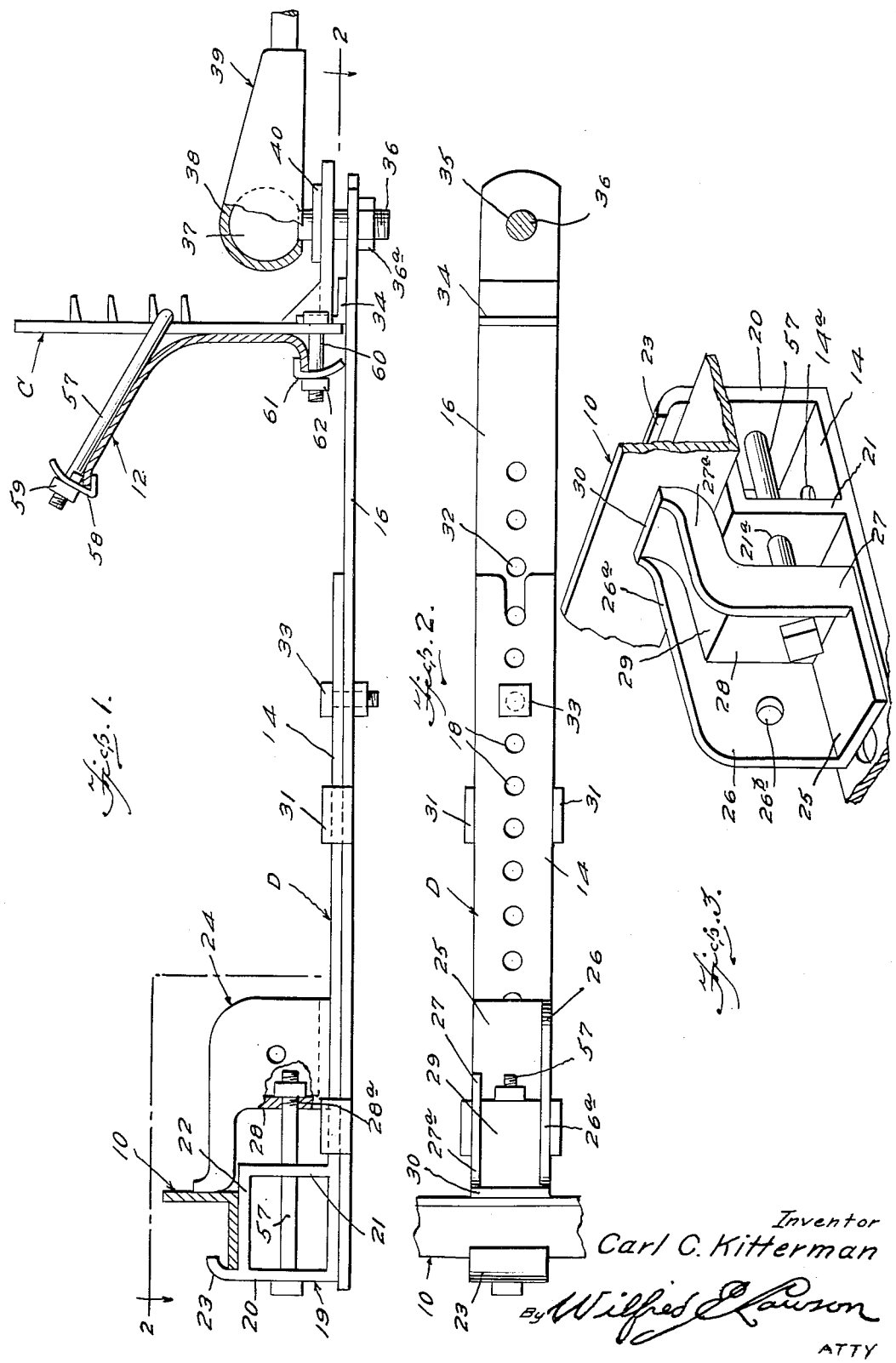
Inventor
Carl C. Kitterman
By Wilfred E. Lawson
ATTY May 15, 1956     C. C. KITTERMAN     2,745,681
VEHICLE COUPLER DRAW BAR FOR TOWING TRAILERS
Filed April 30, 1953     2 Sheets-Sheet 2
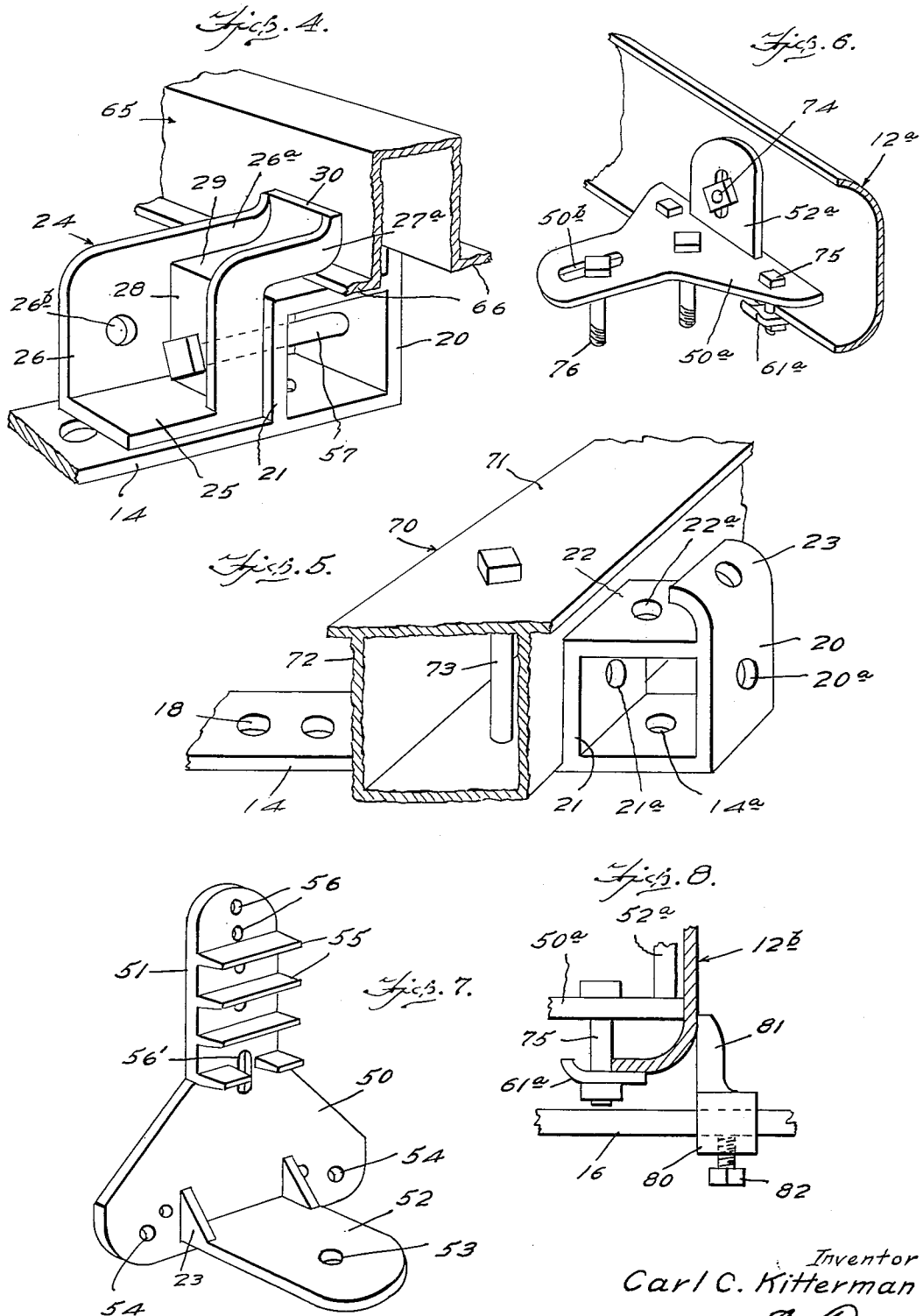
Inventor
Carl C. Kitterman
By Wilfred Lawson
ATTY

United States Patent Office 2,745,681
Patented May 15, 1956

2,745,681

VEHICLE COUPLER DRAW BAR FOR TOWING TRAILERS

Carl C. Kitterman, Albia, Iowa

Application April 30, 1953, Serial No. 352,256

6 Claims. (Cl. 280—501)

This invention relates generally to motor vehicles and is directed particularly to improvements in coupling devices for towing one vehicle behind the other.

An object of the present invention is to provide a novel form of draw bar which is so designed that it can be applied to the rear end of any one of the majority of motor vehicles on the market.

Another object of the invention is to provide a novel draw bar which is designed to be connected both with the vehicle bumper and with a portion of the vehicle chassis frame, whereby the main pull or strain will be upon the chassis frame with the vehicle bumper assisting in supporting the draw bar in working position.

Another object of the invention is to provide a motor vehicle universal coupler draw bar which is so designed that the draw bar when mounted in position is connected with the vehicle bumper in such a manner as to be held securely against side movement or side slip.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in side elevation of the vehicle coupler draw bar of the present invention, parts of which are in section, showing the manner in which the same is connected between a vehicle rear bumper, which is shown in transverse section, and the rear portion of the vehicle chassis frame, which is shown in cross section, the form of chassis frame shown being peculiar to one particular make of motor vehicle.

Figure 2 is a horizontal section taken substantially on the line 2—2 of Figure 1.

Figure 3 is a view in perspective of the special form of clamping means for a frame of the character shown in Figure 1, the clamping means being viewed from the opposite side of the structure from that shown in Figure 1.

Figure 4 is a detail perspective view showing the manner of attaching the clamping means to a chassis frame of a form used upon another make of motor vehicle.

Figure 5 is a view illustrating in perspective a portion of the chassis frame for another make of motor vehicle showing the manner of attaching the draw bar thereto.

Figure 6 is a view in perspective illustrating the use of the bumper clamp on the inside of the bumper to function as a hold down for the draw bar.

Figure 7 is a view in perspective of the form of the bumper clamp illustrated in Figure 1 for supporting the rear end of the draw bar.

Figure 8 is a view illustrating the use of an adjustable clamp lug on the draw bar in association with the bumper clamp when the latter is used in the position shown in Figure 6 but where the bumper does not have a center aperture to receive the bumper clamp securing bolt.

Referring now more particularly to the drawings, Figure 1 illustrates the application of the invention to a motor vehicle chassis frame and bumper, wherein the chassis frame is shown in transverse section and generally designated 10 while the rear bumper of the vehicle is also shown in transverse section and is generally designated 12. It will be understood that the portion of the frame 10 illustrated is that which is nearest to the rear bumper of the motor vehicle and in this view and in Figures 2 and 3 the chassis frame is shown as being of angular cross sectional form such as is used in certain makes of motor vehicles.

The draw bar is generally designated D while the reference character C generally designates one preferred form of clamp for securing the rear end of the draw bar in position across the underside of the vehicle rear bumper.

In accordance with the present invention the draw bar comprises the two long flat bar portions 14 and 16 which comprise suitable lengths of flat strap material of desired weight or gauge and which, when in working relation are disposed one upon and in overlapping relation with the other whereby to provide for the lengthening or shortening of the draw bar in the manner hereinafter set forth.

The bar section 14 is provided throughout the major portion of its length and from one end, which may be defined as the rear end since it is directed toward the rear of the vehicle when the draw bar is in use, with a plurality of bolt holes 18.

At its opposite or forward end the bar section 14 has formed integral with the top surface thereof the upstanding clamping frame which is generally designated 19.

This clamp frame comprises the forward and rear upstanding and spaced walls 20 and 21 respectively and the horizontal plate 22 connecting the walls 20 and 21.

Forming an upwardly extending and rearwardly curving continuation of the forward wall 20 is a hook jaw 23.

The walls 20 and 21 are provided with the alined openings 20a and 21a as best seen in Figure 5, while the plate 22 and underlying portion of the bar section 14 are provided with the vertically alined bolt apertures 22a and 14a respectively.

Formed to position upon the top of the bar section 14 for cooperation with the clamp frame 19 and jaw 23, in gripping a chassis frame as illustrated, is a movable jaw member which is generally designated 24.

This movable jaw member comprises a bottom plate 25 from one side of which rises a wall 26 while a wall of similar height but less length rises from the opposite side as indicated at 27.

Between the forward edges of these walls 26 and 27 is a front wall 28 and formed integral with the top of the wall 28 is a forwardly extending tongue 29 which terminates in an upwardly curved jaw flange 30.

To add to the rigidity of the forwardly extending tongue 29, each longitudinal edge thereof has an upstanding flange extending therealong, each of which flanges forms a forward continuation of one of the side walls 26 or 27 and such flanges are designated 26a and 27a.

The jaw member wall 28 is provided with a bolt hole 28a which alines with the holes 21a and 20a and the side wall 26 is also provided with a bolt hole which is designated 26b.

The bar section 16 is provided in its forward half with the pairs of transversely spaced upstanding ears or guide flanges 31 and when the bar section 14 is placed on the top of the lower and rearwardly extending sections 16 the upper bar section is snugly engaged between these pairs of ears so that the two sections are maintained firmly in parallel relation.

The lower bar section also is provided with a longitudinally extending series of bolt holes 32 which are designed for alignment with the holes 18 to receive a coupling bolt 33 after the length of the draw bar has been adjusted for the purpose of gripping the chassis frame portion 10 between the jaws at the forward end thereof with the rear end of the lower bar section 16 extending a desired distance rearwardly of and beneath the rear bumper 12.

At its rear end the bar section 16 has a transversely extending upstanding flange 34 for the purpose hereinafter set forth and rearwardly of this flange the bar is provided with an aperture 35 to receive the threaded lower end portion of a stud 36 carried by a ball 37 which is designed to receive or be engaged in a socket element 38 of a coupling bar 39, of a trailer or the like (not shown).

The stud 36 of the ball 37 has formed therearound a collar 40 which, when the ball is carried directly upon the rear end of the bar section 16, rests upon such section or when use is made of the clamping plate C in the manner illustrated the collar will engage a portion of this plate as hereinafter described.

The clamping plate or clamping connection C by which the rear end of the draft bar is held in position beneath the rear bumper 12, comprises an upstanding plate 50 of substantial width having the reduced central portion 51 continuing upwardly therefrom.

Extending from the bottom edge of the plate 50 at right angles thereto is the tongue 52 which has an aperture 53 therethrough.

At opposite sides of the tongue 52 the plate 50 has bolt openings 54 therethrough for the purpose hereinafter set forth.

The extended portion 51 of the plate body 50 has formed integrally therewith and across the rear face thereof, the spaced ribs 55 and this portion 51 is also provided with a longitudinal series of bolt openings 56, the lower one of which is elongated as indicated at 56'.

In the application of the draft bar to an angle iron chassis frame of the character illustrated in Figures 1 to 3, the hook jaw 23 is engaged across the forwardly directed edge of the horizontal flange of the bar and the movable jaw member is then placed in position to have the upturned forward end of the tongue bear against the rear side of the vertical flange. The frame member will rest upon the top plate 22 of the clamp frame as illustrated and the frame 19 and movable jaw member 24 are then coupled together by the bolt 57 in the manner illustrated.

The rear end of the bar section 16 extends below and beyond the rear bumper 12 as shown and the clamp plate 50 is positioned vertically against the rear face of the vertical portion of the bumper with the flange 34 of the bar section 16 engaged against the rear face of the plate 50 at the bottom thereof as shown.

A U bolt 57 has its yoke portion then engaged between a pair of the ribs 55 of the clamp plate and the threaded free ends of the legs of the U bolt are disposed across the top of the bumper and each has placed thereover an apertured clamp hook 58 which engages the top edge of the bumper as shown and is held in place by a nut 59 which draws the U bolt tightly into position.

At each side of the tongue 52 of the clamp plate, a bolt 60 is passed through a bolt hole 54 to extend across the bottom edge of the bumper and each bolt 60 passes through an apertured clamp hook 61 which is held in position in engagement across the bottom edge of the bumper, by a nut 62 which is threaded on the end of the bolt 60 as illustrated in Figure 1.

When the clamp plate is thus positioned on the bumper and the rear end of the bar section 16 positioned to have the flange 34 engage the bottom of the clamp plate, the opening 35 in the bar section 16 will be in line with the opening 53 of the tongue 52 so that the shank 36 of the coupling ball can be extended downwardly therethrough and the collar 40 positioned upon the top of the tongue 53 as illustrated. A nut 36a is then threaded on the lower end of the stud 36 against the bottom side of the bar section 16 which will firmly couple the adjacent parts together.

Figures 4 and 5 illustrate the manner in which the forward end of the draw bar may be coupled to two other types of chassis frames.

In Figure 4 the chassis frame shown is in the form of an inverted channel body which is generally designated 65 and which has outwardly directed flanges 66 extending along its longitudinal edges. With this construction the top plate 22 of the clamp frame is positioned across and against the undersides of the flanges 66 with the hook jaw 23 engaging across the forward flange.

The movable jaw 24 is positioned upon the opposite side of the frame channel as shown with the upturned ends of the tongue 29 overlying the adjacent flange 66 and bearing against the side of the channel and the bolt 57 is employed for drawing the parts together as in the structure illustrated in Figure 1.

In Figure 5 there is shown a box type chassis frame which is generally designated 70 and which has a top wall 71 which has its longitudinal edges extending beyond the vertical side wall 72 as illustrated.

With this latter construction the rear side wall 21 of the clamp frame 19 is positioned against the forward side of the chassis frame or the forward vertical wall portion 71 thereof and the bottom of the chassis frame rests upon the top of the bar section 14 and a bolt 73 is then passed downwardly through apertures in the frame and through one of the bolt holes 18 to receive upon its lower end a holding nut, not shown, whereby to draw the bar portion 14 upwardly firmly against the underside of the frame.

It is to be understood, of course, that with the different ways of connecting the forward end of the draw bar structure to the several different types of chassis frames, the rear end portion of the draw bar will be secured across the underside of the back bumper of the vehicle either in the manner illustrated in Figure 1 or by the means illustrated in Figure 6 or 8.

In Figure 6 there is illustrated the use of a clamp plate in a horizontal position upon the inner or forward side of the rear bumper, where such bumper is provided centrally of its ends with a bolt opening. In this arrangement the plate 50a is placed horizontally with its bottom edge against the inner or forward side of the rear bumper of the vehicle, here designated 12a, with the apertured tongue 52a disposed vertically against the inner side of the bumper to receive a bolt 74.

The bolt holes formed through the plate 50a at two sides of the tongue 52a, receive short downwardly extending bolts 75 which engage the apertured clamp hooks 61a and draw them up tightly into engagement with the bottom edge of the bumper.

The horizontally disposed plate 50a has the apertured portion of the bar section 16 disposed longitudinally of its underside and bolts 76 are extended downwardly through apertures in the plate 50a and through the bolt holes 32 of the bar section 16 and draw the bar section up tightly against the lower edge of the bumper 12a.

The rear end of the bar section 16 will then be extended beyond the rear side of the bumper 12a so that the stud 36 of the coupling ball 37 can be passed through the opening 35 and the collar 40 of the stud may rest upon the top of the bar portion 16 to which it will be secured by the nut 36a as will be obvious.

The modified clamp plate 50a in Figure 6, is provided for use upon certain late model cars where clearance is not sufficient to permit use of the plate 50. The slot 50b of plate 50a may also be employed to receive a T- bolt, in the same manner as plate 50, if it is desired to use plate 50a in upright position.

Also in connection with the clamp plate shown in Figure 7 a straight bolt may be employed in place of the U-bolt 57, in which case such straight bolt would be engaged through one of the holes 56 or through the slot 56'.

In connection with the employment of the plate 50a upon bumpers which may not be provided with an aperture to receive the bolt 74, use is made of the clamp element illustrated in Figure 8. In this figure a portion only of the plate 50a is shown in the position in which it is illustrated in Figure 6, with its bottom edge against the inner or forwardly directed face of the vehicle rear bumper which is designated 12b.

Bar portion 14 of the draw bar structure is extended below bumper 12b and it has slideably positioned thereon a collar 80 which carries an upwardly extending clamping jaw 81 which is designed to be positioned against the rear or outer face of the bumper as shown. When the jaw 81 is in this position the collar 80 is fixed against movement on the bar portion 14 by the set screw 82.

With the arrangement just described it will be seen that the bar portion will be firmly held against longitudinal movement in either direction by the combined effort of the clamp jaw 81 and the supporting bolts which are passed downwardly through the plate 50a and through the bar portion 14, which bolts are illustrated in Figure 6.

While in the foregoing description an illustration has been made of the application of the universal draw bar structure to only three types of motor vehicle chassis frames it is believed that it will be apparent that with the illustrated structure the forward end of the draw bar may be readily clamped upon any type of chassis frame.

It will also be seen from the foregoing that with the structure herein described the draw bar will pull directly from the chassis frame instead of from the motor vehicle rear bumper as is commonly done with other types of draw bars. In the present case the motor vehicle bumper 12, 12a or 12b will not be subjected to pulling strains but functions to firmly support the rear end of the draw bar structure and to prevent it from swinging or tending to swing sideways.

From the foregoing it will be seen that the present invention provides a draw bar or draw hitch by means of which trailers or other structures may be attached to the rear of a motor vehicle, wherein the strain of the pull is taken by the vehicle chassis frame rather than by the bumper of the vehicle as is common practice and it will also be seen that the present invention provides a draw bar or draw hitch which is adapted to be applied or secured to the chassis frame of any make of motor vehicle regardless of the cross sectional form or design of the frame. Thus the present invention provides a universal draw bar or hitch which can be easily attached to and removed from the vehicle chassis frames.

I claim:

1. A draw bar of the character stated comprising two bar sections in end overlapping relation, means adjustably securing the same together for varying the length of the draw bar, an upstanding clamp frame integral with an end of one bar section and having a flat top for engaging the underside of a vehicle chassis frame, an upstanding jaw tongue formed across said flat top, a movable jaw member positioned on said one bar section and comprising a base portion, an upstanding wall carried by the base portion and a jaw tongue extending from said wall toward the first jaw tongue at an elevation above said flat top, means for coupling said clamp frame and said jaw member together, said last means being adapted to draw the movable jaw member toward the clamp frame, means carried by the other bar section at the end thereof remote from the clamp frame for the attachment of a draft element to the draw bar, and means for clamping said other bar section at the end thereof to a vehicle bumper.

2. A draw bar designed for connection between a vehicle chassis frame and an adjacent rear bumper, comprising an elongate member formed in two bar sections, means adjustably coupling the sections together for lengthening or shortening the member, a fixed jaw carried on an end of one bar section, a movable jaw on said one bar section for coaction with said fixed jaw to grip the vehicle chassis frame across which said end of said one bar section positions, the remote end of the other bar section being designed to extend across the underside of the vehicle bumper, a coupling element secured to and rising from the top of the said end of said other bar section, said other bar section having a number of bolt apertures longitudinally thereof, and means for securing said remote end of said other bar section to the overlying bumper comprising an apertured plate disposed horizontally upon the inner side of the bumper with one edge opposing the bumper, said plate overlying the apertured portion of said other bar section, a bolt passing through the apertured plate and underlying bar section, and means securing the plate to the bumper.

3. A draw bar of the character stated comprising two bar sections in end-overlapping relation, means adjustably securing the same together for varying the length of the draw bar, an upstanding clamp frame on an end of one bar section and having an upper surface for engaging the under side of a vehicle chassis frame, an upstanding jaw tongue formed on said clamp frame, a movable jaw member positioned on said one bar section and comprising an upstanding wall and a jaw tongue extending from said wall toward the first jaw tongue at an elevation above said clamp frame, means for coupling said clamp frame and said jaw member together, said last means being adapted to draw the movable jaw member toward the clamp frame, means carried by the other bar section at the end thereof remote from the clamp frame for the attachment of a draft element to the draw bar and means for clamping said other bar section at the said end thereof to a vehicle bumper.

4. A draw bar designed for connection between a vehicle chassis frame and an adjacent rear bumper, said draw bar comprising an elongated member formed in two bar sections, means adjustably coupling the sections together for lengthening or shortening the member, a fixed jaw carried on an end of one bar section, a movable jaw on said one bar section for coaction with said fixed jaw to grip the vehicle chassis frame across which said end of said one bar section positions, the remote end of the other bar section being designed to extend across the under side of the vehicle bumper, a coupling element secured to and extending upwardly from the top of the said end of said other bar section, and means for securing said remote end of said other bar section to the underlying bumper comprising a clamp member secured to said other bar section adjacent the remote end thereof, an upstanding portion on said clamp member for engaging the outer surface of said bumper, means for clamping the lower portion of said upstanding portion to the lower edge of said bumper, a plurality of ribs on the outer surface of said upstanding portion, a U-bolt or selective engagement between two adjacent ribs and clamping means on the ends of said U-bolt for securing said upstanding portion to the upper edge of said bumper.

5. A draw bar designed for connection between a vehicle chassis frame and an adjacent rear bumper, said draw bar comprising an elongated member formed in two bar sections, means adjustably coupling the sections together for lengthening or shortening the member, a fixed jaw carried on an end of one bar section, a movable jaw on said one bar section for coaction with said fixed jaw to grip the vehicle chassis frame across which said end of said one bar section positions, the remote end of the other bar section being designed to extend across the under side of the vehicle bumper, a coupling element secured to and extending upwardly from the top of the said end of said other bar section, and means for securing said remote end of said other bar section to the underlying bumper comprising a clamp member secured to said other bar section adjacent the remote end thereof, an upstanding portion on said clamp member for engaging the outer surface of said bumper, a plurality of ribs on the outer surface of said upstanding portion, a U-bolt for selective engagement between two adjacent ribs and clamping means on the ends of said U-bolt for securing said upstanding portion to the upper edge of said bumper.

6. A draw bar designed for connection between a chassis frame and an adjacent rear bumper of a motor vehicle, said draw bar comprising an elongated member formed in two bar sections, means adjustably coupling the sections together in overlapping relation for lengthening or shortening the member, a fixed jaw carried on the outer end of one bar section, a movable jaw on said one bar section for coaction with said fixed jaw to grip the said chassis frame across the under side of which said end of said one bar section positions, the outer end of the other bar section extending across the under side of the said bumper, a coupling element carried by the said end of said other bar section, said element comprising a stud rising from the said end of the other bar section adjacent the outer side of said bumper, a ball on the upper end of said stud, a right angled clamp plate having a horizontal portion extending forwardly from said stud and an upstanding portion abutting the outer surface of said bumper, and means engageable with the upper and lower end portions of said upstanding portion and the like edges of said bumper for securing said clamp plate rigidly in place, said ball being adapted to engage in a socket carried by the usual hitch-bar of the trailer.

References Cited in the file of this patent

UNITED STATES PATENTS

| | | |
|---|---|---|
| 2,485,743 | Koback | Oct. 25, 1949 |
| 2,486,161 | Hughes | Oct. 25, 1949 |
| 2,546,664 | Burnside | Mar. 27, 1951 |
| 2,549,941 | Smith | Apr. 24, 1951 |
| 2,575,171 | Hulse | Nov. 13, 1951 |
| 2,604,331 | Kingston | July 22, 1952 |